United States Patent
Berthold et al.

(10) Patent No.: US 7,368,722 B2
(45) Date of Patent: May 6, 2008

(54) METHOD AND APPARATUS FOR DETECTING IONIZING RADIATION

(75) Inventors: Fritz Berthold, Pforzheim (DE); Wilfried Reuter, Straubenhardt (DE); Peter Haefner, Neuenbürg (DE)

(73) Assignee: Berthold Technologies GmbH & Co. KG, Wildbad (DE)

( * ) Notice: Subject to any disclaimer, the term of this patent is extended or adjusted under 35 U.S.C. 154(b) by 0 days.

(21) Appl. No.: 11/064,113

(22) Filed: Feb. 23, 2005

(65) Prior Publication Data

US 2006/0081786 A1    Apr. 20, 2006

(30) Foreign Application Priority Data

Feb. 25, 2004   (DE)   ................ 10 2004 009 104

(51) Int. Cl.
*G01T 1/20* (2006.01)
(52) U.S. Cl. ..................... 250/369; 250/362
(58) Field of Classification Search ................ 250/362, 250/369
See application file for complete search history.

(56) References Cited

U.S. PATENT DOCUMENTS

| | | | |
|---|---|---|---|
| 3,293,432 A | 12/1966 | McCall et al. | |
| 4,107,534 A | 8/1978 | Piltingsrud et al. | |
| 4,454,587 A | 6/1984 | Kiefer et al. | |
| 4,476,388 A | 10/1984 | Yakubovitch et al. | |
| 4,931,646 A * | 6/1990 | Koechner et al. | 250/367 |
| 5,198,670 A * | 3/1993 | VanCauter et al. | 250/328 |
| 5,321,261 A * | 6/1994 | Valenta | 250/252.1 |
| 5,347,129 A * | 9/1994 | Miller et al. | 250/336.1 |
| 5,367,168 A * | 11/1994 | Berthold et al. | 250/362 |
| 5,391,878 A * | 2/1995 | Petroff | 250/367 |
| 5,521,386 A * | 5/1996 | Taboada | 250/363.02 |
| 5,796,108 A | 8/1998 | Fleming et al. | |
| 6,078,052 A * | 6/2000 | DiFilippo | 250/367 |

(Continued)

FOREIGN PATENT DOCUMENTS

EP    1 074 856 A2    2/2001

(Continued)

OTHER PUBLICATIONS

Knoll G.F. "Radiation Detection and Measurement", 2 Edition, John Wiley & Sons, pp. 231 and 237.

(Continued)

*Primary Examiner*—David Porta
*Assistant Examiner*—Shun Lee
(74) *Attorney, Agent, or Firm*—Browdy and Neimark, P.L.L.C

(57) ABSTRACT

A method for detecting ionizing radiation with the aid of a scintillation counter and a photomultiplier using an inorganic solid-matter scintillator that incorporates at least one decay time component greater than 100 ns and measures the photons emitted by the scintillator with a fast single-photon counter. The single-photon counter is composed of a fast photomultiplier with high internal amplification, a stabilized high-voltage supply and a fast amplifier/discriminator with standard pulse output. With this arrangement, the measurement of all types of radiation, like alpha, beta, gamma and X radiation, can be performed, with low manufacturing costs for the detector, a high degree of sensitivity especially with regard to low beta energies, only small sensitivity changes over a large temperature range of −20 to +50 degrees C., and good long-term stability.

7 Claims, 5 Drawing Sheets

U.S. PATENT DOCUMENTS

| | | | |
|---|---|---|---|
| 6,392,238 | B1 | 5/2002 | Maekawa et al. |
| 6,518,556 | B2 * | 2/2003 | Staton et al. ............... 250/207 |
| 2002/0175291 | A1 * | 11/2002 | Reeder et al. ............. 250/369 |
| 2005/0269515 | A1 * | 12/2005 | Saleh et al. ................. 250/369 |

FOREIGN PATENT DOCUMENTS

| | | |
|---|---|---|
| EP | 1 315 003 A1 | 5/2003 |
| JP | 0 851 242 A2 | 7/1998 |
| SU | 397073 A | 10/1983 |

OTHER PUBLICATIONS

Iida, et al., "A Low-Energy Beta-Particle Imaging System For Measuring Tritium Distributions", Nuclear Instruments and Methods in Physics Research, Section—A: Accelerators, Spectrometers, Detectors and Associated Equipment, North-Holland Publishing Company, Amsterdam, NL, Dec. 15, 1986, pp. 119-127, vol. 253, No. 1, XP0000480996, ISSN: 0168-9002.

* cited by examiner

METHOD AND APPARATUS FOR DETECTING IONIZING RADIATION

BACKGROUND OF THE INVENTION

1. Technical Background

The invention relates to a method and an apparatus for scintillation counting of ionizing radiation.

In radionuclide laboratories, in nuclear facilities and in general radiation protection, measurements are regularly conducted, e.g., for establishing radioactive contamination or the dose rate, as well as for activity measuring.

In process measurement technology, such as for measuring fill level, density, or weight per unit area, nuclear measuring processes are widely used as well. The detectors that are utilized are especially scintillation counters, counting tubes and ionization chambers.

2. Prior Art

The publication by KNOLL, entitled "Radiation detection and measurement", $2^{nd}$ edition (p. 231 and 237) discloses that ZnS, and specifically ZnS(Ag), is the material of choice for detection of alpha radiation and has a high light output in response to that radiation. In contrast, ZnS(Ag) is apparently not suitable for detection of other types of radiation.

The prior art, which has already been described in U.S. Pat. No. 5,796,108, is thus as follows:

If only alpha radiation is measured, only ZnS(Ag) is used as the scintillator. If only beta radiation is measured, a plastic scintillator is used. However, if alpha and beta radiation are to be measured simultaneously and separately, a "sandwich" scintillator is used. It consists of a flat plastic scintillator with an applied layer of ZnS(Ag), with the latter facing the probe. The thickness of the ZnS(Ag) layer is selected such that preferably all alpha particles are stopped and generate light in the process, which is achieved with a ZnS(Ag) layer thickness of approximately 6 mg/cm². In all embodiments, a light-proof radiation inlet window, usually a metallized plastic film, is located above the scintillator.

The scintillator may be mounted directly on the inlet window of the photomultiplier. This is not possible, however, with surface-contamination monitors since the scintillators have surface areas of typically 100-200 cm², whereas the inlet windows of preferred photomultipliers have a diameter of only approximately 25 mm. The photons are thus bundled in this case from the scintillator with the aid of a reflector onto the photocathode.

The output pulses of the photomultiplier pass through a linear amplifier with pulse shaping times of typically 1-20 µs. The discrimination between alpha radiation on one hand, and beta/gamma/X-radiation on the other hand, takes place in the known process with sandwich scintillators based on amplitudes that are sorted by pulse amplitude discriminators into the corresponding channels.

This method has a number of shortcomings:

The sensitivity to low-energy beta radiation is low, since this radiation must first penetrate the ZnS(Ag) layer where it does not generate any signal that can be measured with conventional methods, before reaching, with its residual energy, the plastic scintillator. One also no longer obtains a visible plateau in this case, i.e., no stable operating point in dependence upon the pulse rate as a function of the high voltage.

Plastic scintillators with ZnS(Ag) coating additionally require a special and complex manufacturing process and, consequently, high costs for the detector and thus for the measuring system.

BRIEF SUMMARY OF THE INVENTION

The present invention lies in the conception of a measuring system with low manufacturing costs for the detector, with the goal of increasing the sensitivity of the measuring system, especially in the case of low beta energies, with only slight sensitivity changes in a large temperature range of −20 to +50° C., as well as with good long-term stability.

This is achieved by a method for detection of ionizing radiation with the aid of a scintillator and a photomultiplier, comprising: providing a solid matter scintillator that incorporates at least one decay time component greater than 100 ns; and measuring photons emitted by the scintillator with a fast single-photon counter.

Surprisingly, combining one single scintillator that is provided with decay time components of over 100 ns, and thus permits a time resolution of the single photon pulses, with a single-photon counter permits the measurement of all types of radiation, such as alpha, beta, gamma and X-radiation. The term single-photon counter refers to a detector for photons, preferably in the visible range or in the near ultraviolet or infrared. It is composed of a fast photomultiplier with high internal amplification, which is achieved, among other things, with a large number of dynodes (e.g., 10), a stabilized high-voltage supply and a fast amplifier/discriminator with standardized pulse output. A single-photon counter may also use a semiconductor component with internal amplification, e.g., an avalanche photodiode, in place of a photomultiplier.

Evaluation circuits provided downstream of the single-photon counter can distinguish the individual types of radiation from one another and thus separate and measure them simultaneously or also individually or together.

It is also possible to combine the inventive method with conventional ones, e.g., to use the inventive method for measuring beta and gamma radiation, but to measure alpha radiation in the conventional manner using a slow amplifier-discriminator circuit.

A scintillator with the above properties can be produced relatively easily either by sedimentation with a suitable solution or by application using a spray gun, known per se, which decisively reduces the manufacturing costs of the detector and, hence, those of the measuring system.

Advantageous further developments of the invention relate especially to the evaluation circuit. With suitable further developments of the evaluation circuit exclusively for the basic evaluation within the framework of the single-photon measurement or with additional circuit components, the inventive measuring system can be designed for measurements within the framework of a multitude of applications, making possible in particular individual measurements of a predefined type of radiation, but also simultaneous measurements of multiple types of radiation, for example for application in radiation protection, with radiometric measurement techniques, or for use in dosimetry.

The rate of the output pulses of the single-photon counter can be used directly as the measure for the intensity of the ionizing radiation. It is also possible, however, to analyze these output pulses by means of a correlation circuit in the downstream evaluation circuit, in order to thus attain a good signal-to-noise ratio, or in order to separate different types of radiation.

A correlation circuit of this type recognizes from the time sequence of the standardized pulses from the single-photon counter typical sequences stemming from the interaction of the ionizing radiation with the scintillator, through which both the unavoidable noise pulses can be separated from the ionizing radiation events of interest and the ionizing radiation can be identified by its type, e.g. as alpha radiation on the one hand and beta/gamma/X-radiation on the other hand. A correlation circuit that is designed for this purpose may be designed in such a way that an output pulse from the single-photon counter opens a gate for a pre-defineable gate duration, during which additional pulses may possibly be counted. In dependence upon the number N of these additional pulses and the gate duration, a decision can be made through comparison with a predefineable typical value for a type of radiation, as to whether the pulses that have arrived during the gate period, or window, are the result of an ionizing radiation event of this type.

An improvement of a correlation circuit of this type then also permits, through setting of two typical values for the ionizing radiation events, a discrimination between these radiation types on the basis of the number N of the pulses that have arrived during the gate window.

This type of correlation measurement of the output pulses of the single-photon counter will be referred to below in short as "burst recognition."

During a burst recognition, single photon events on the basis of thermal electron emissions from the photocathode, because of their statistical distribution, can contribute only via accidental coincidences. This contribution to the count rate can therefore be neglected in the range of the background events, even if the thermal electron emission increases at higher temperatures.

Since the operating point, i.e., the high voltage of the photomultiplier, is selected such that operation occurs in the single photon plateau, one also obtains a good plateau for the burst pulse rate, independently from the energy of the ionizing radiation.

By means of the burst recognition downstream of the single-photon counter, both a single measurement (setting of the typical N-value for the type of radiation to be detected), as well as a simultaneous or parallel measurement of multiple types of radiation is possible, in such a way that from the number of pulses counted in the gate window, a conclusion is drawn regarding the type of the detected radiation event.

For simultaneous measurement of different types of radiation, the evaluation circuit may operate exclusively with the single photon measurement in connection with the burst recognition, but it may also, according to an embodiment of the inventive measuring system, provide for a separate channel that operates, for the detection of alpha particles according to the known method, with a charge-sensitive pre-amplifier having a downstream pulse formation of approximately 1 μs and an integral discriminator, and which will be referred to below in short as an "alpha channel."

With an alpha channel of this type, counting processes are possible that are time-independent of one another; if during the measurement of ionizing events by means of burst recognition, alpha pulses or pulses from cosmic radiation should be recognized at the same time in the alpha channel, the burst recognition is deactivated by means of a veto signal generated by the alpha channel, in order to prevent artifacts including noise pulses from the afterglow of the scintillator. Due to their very intense interaction with the scintillator, alpha pulses or pulses from cosmic radiation generate large light flashes and undesirable afterglow (phosphorescence) and, therefore, generate single photon signals, to which the burst recognition would respond as well.

Additional advantageous designs can be gathered from the following description.

BRIEF DESCRIPTION OF THE DRAWINGS

Example embodiments of apparatuses for performing the inventive method will be explained below with reference to the drawings, in which.

DETAILED DESCRIPTION OF THE INVENTION

Figure 1:
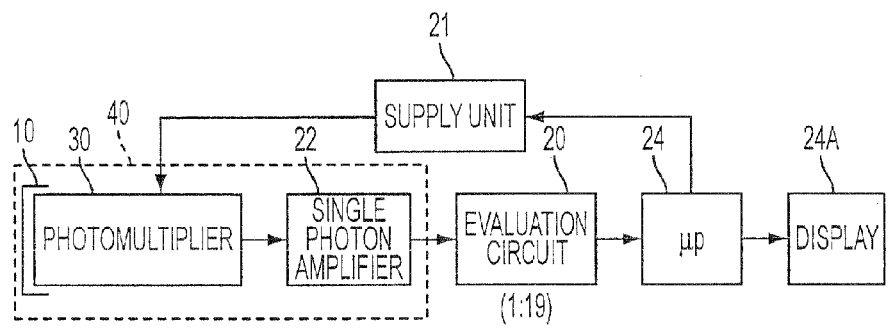
FIG. 1 is a block diagram of a preferred arrangement for performing the inventive method.

FIG. 1 shows an arrangement for performing the inventive process in its intrinsic design.

A photomultiplier 30 has assigned to it a scintillator 10 as a component of a detector whose inventive design will be described in detail based on examplary embodiments shown in FIGS. 6-11.

Photons generated in scintillator 10 due to the interactions described earlier herein are registered, amplified in the downstream photomultiplier 30, and the output pulses from photomultiplier 30 are supplied to a fast single-photon amplifier 22 with a discriminator stage. The discriminator stage acts to generate pulses of uniform amplitude for all single photons-that exceed a selected energy threshold, typically 20 mV, resulting in "normalized" pulses that can be properly processed in the following processing stages.

This arrangement of the photomultiplier 30 and single-photon amplifier 22 that is outlined in broken lines in FIG. 1, will be referred to below as the single-photon counter 40.

Provided downstream of the single-photon counter 40 is an evaluation circuit 20, which may be designed in various ways, as will be explained below.

Evaluation circuit 20 serves to provide counting pulses, on the basis of an ionizing radiation event that has been identified according to its type, to a microprocessor unit 24. The evaluation and conversion of the standardized output pulses of the single-photon counter 40 into such counting pulses for the microprocessor unit is, therefore, a function of the evaluation circuit 20.

A supply unit 21, which is also controlled by the microprocessor unit 24, serves for the high-voltage supply of the photomultiplier 30.

Figure 2A:
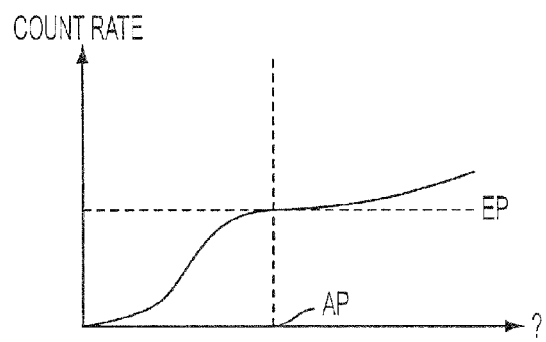
FIGS. 2A-2C are waveforms showing counting rates and amplitudes measured with the arrangement according to FIG. 1.

From the photocathode of photomultiplier 30, single photoelectrons are triggered by impinging photons corresponding to the quantum yield. These photoelectrons are multiplied in the dynode chain of the photomultiplier and generate on the anode thereof very fast output signal pulses with a width of typically 10 ns, as illustrated in FIG. 2C.

Even though each signal pulse stems from a single photoelectron, the pulse amplitude distribution (FIG. 2B) is reflected as a wide peak because of the statistical nature of the secondary electron multiplication. The pulse amplitude distribution additionally shows a steep rise as a function of decreasing low pulse amplitudes, which stems from photoelectric effects from dynodes, electronic noise, etc.

A stable operating point is obtained if the discriminator threshold is adjusted in the "valley" between the two ranges to the position denoted with DS. If one now changes the high voltage level, one obtains at the output of the discriminator a function of the pulse rate that is shown in FIG. 2A. It indicates a so-called plateau EP, i.e., a range in which the counting rate as a function of the high voltage changes only slightly.

The high voltage is adjusted such that it lies in the plateau (operating point AP). As a result, drifts of the dynode amplification, of the high-voltage, of the electronic amplification, etc., have only little impact on the result. Single-photon counters therefore are characterized, in addition to the highest possible sensitivity, by an excellent long-term stability. Supply unit 21 is controlled by a signal from microprocessor unit 24 to fix the value of that high voltage to photon counter in photomultiplier 30 to the value AP (FIG. 2A) in order to eliminate the influence of internal amplification variations on the counting rate. This requires only one calibration after manufacture, with no subsequent calibration being needed and no control loop being required to maintain the operating point AP and thus system stability.

It should also be mentioned that electrons are triggered not only by photons but also spontaneously from the photocathode and in this manner trigger an undesirable null effect, which is highly temperature-dependent. The elimination of this interference is also achieved by the invention in that electrons emitted spontaneously from the photocathode are prevented from being counted, as will be described in greater detail below.

A display 24A is used to display the evaluation result.

In a simple first preferred embodiment, evaluation circuit 20 operates as a count rate reducer. Since, during one single radioactive event, multiple single photons are generated as a rule, which are registered by the single-photon counter 40, a suitable count rate reduction is established (e.g., 1:20) in the evaluation circuit 20, in order to be able, for example, to assign to 20 output pulses (burst) of the single-photon counter 40 a count rate pulse representative for one ionizing event. This is not intended to recognize a certain type of radiation.

Figure 2B:
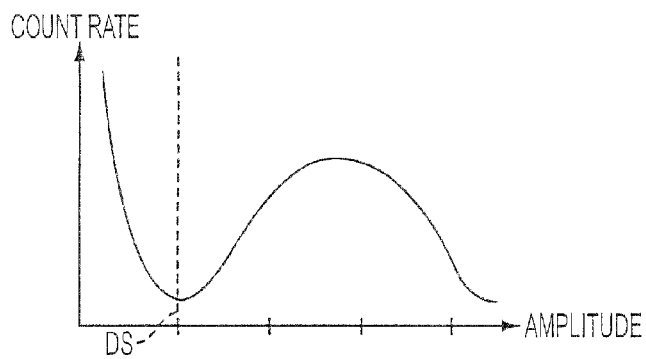
Figure 2C:
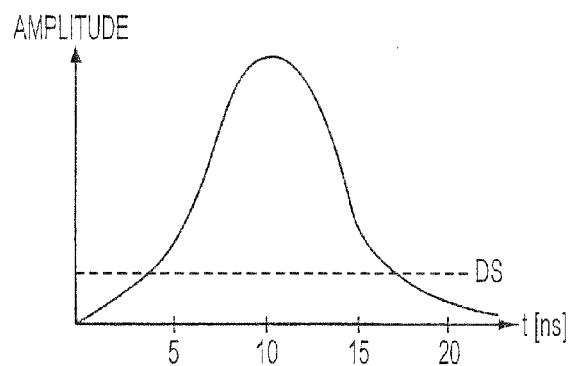

FIG. 2B shows a typical pulse amplitude spectrum of a photomultiplier 30, corresponding to the response to a single photon that is suitable for single photon counting.

The increase at low amplitudes stems from thermal electrons from dynodes and electric noise, the subsequent maximum width of higher amplitudes in this pulse amplitude distribution corresponds to individual electrons from the photocathode, which may be photoelectrons triggered by light quanta or thermal electrons from the photocathode.

The discriminator threshold DS is positioned at the minimum between the single electron maximum and noise in order to thus obtain the above-mentioned single-photon plateau EP (FIG. 2A).

FIG. 2C shows a typical single-photon pulse with a half-value width of approximately 10 ns.

Additional further developments of the apparatus for implementing additional advantageous variants of the inventive method will now be described below, which essentially represent improvements and supplementations of the evaluation circuit 20.

Figure 3:
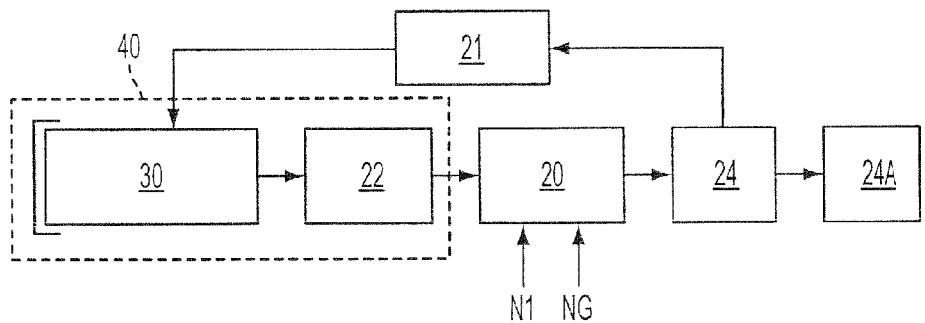
FIG. 3 is a block diagram of an arrangement for measuring a radiation type by means of burst recognition.

In the exemplary embodiment of the apparatus according to FIG. 3, evaluation circuit 20 incorporates a correlation circuit, whereby the above explained burst recognition can be performed with an adjustable gate duration TG and pre-selectable pulse number N1.

The operating principle of this circuit is such that the first discriminated output signal (standard pulse) of the single-photon counter 40 opens a gate pulse for a certain time TG (gate duration), preferably 2-30 µs.

The standard pulses that arrive within the gate duration TG are counted. If the number N of the arriving standard pulses is at least the same as the predefined pulse number N1, this is considered evidence of an ionizing event that is typical for the value N1, and a counting pulse is then sent from the correlation circuit to the microprocessor electronics 24.

This variant is particularly suitable for the measurement of an ionizing event that, through selection of TG and N1, can be predefined with respect to its type, i.e., either alpha radiation or beta/gamma/X-radiation. The number of counting pulses of the evaluation circuit 20 that is routed to the microprocessor unit 24, consequently represents the intensity of this selected radiation.

The circuit can be designed dynamically to the extent that, as soon as the predefined number N1 (N=N1) is reached, the gate window will be closed (T<TG) and the burst recognition is thus again ready to register a new ionizing event.

Figure 4:
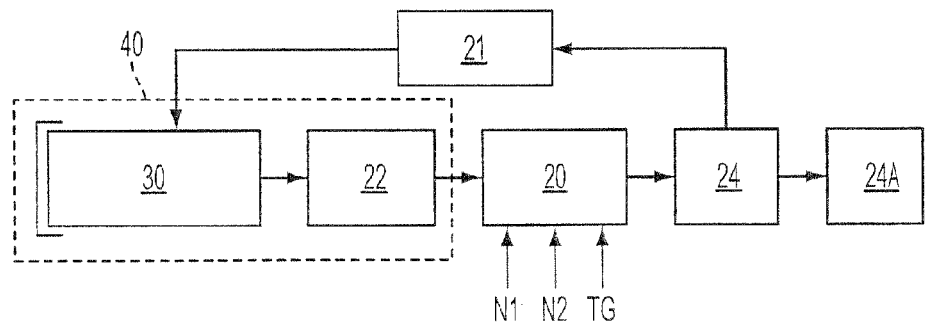
FIG. 4 is a first block diagram of an arrangement for discriminating between types of radiation by means of burst recognition.

FIG. 4 shows a first block diagram of an apparatus embodiment in which the evaluation circuit 20 is designed such that beta-gamma-X-radiation on one hand and alpha particles on the other hand can also be measured simultaneously (i.e., in parallel) exclusively by means of a burst recognition, namely in such a way that the pulse number N1 that is "required" for classifying an ionizing event as beta particles, is selected, for example, between 1 and 20 and a second pulse number N2 is preset, for example between 5 and 50 for classifying an ionizing event as alpha particles, wherein N2 must be selected greater than N1.

In the classification of the N pulses that fell into the predefined gate window with the gate width TG in the evaluation circuit 20, three cases are possible with this concept, which need to be distinguished:

a) N<N1 (<N2): The registered event is to be classified neither as alpha nor as beta/gamma/X-radiation. This relationship assures that electrons emitted spontaneously from the photocathode are prevented from being counted because single photon pulses fulfill this relationship and can therefore be separated from beta/gamma/alpha signals.

b) N1≦N<N2: It is a beta/gamma/X signal.

c) N2≦N: It is an alpha signal.

The evaluation circuit 20 and the alpha channel 50 in this embodiment are designed such that they permit the separate acquisition of radiation events of this type and, when the condition b) or c) is met, activate a separate "alpha counter" 24α or "beta counter" 24β (shown in FIG. 5) in the microprocessor evaluation unit 24.

Figure 5:
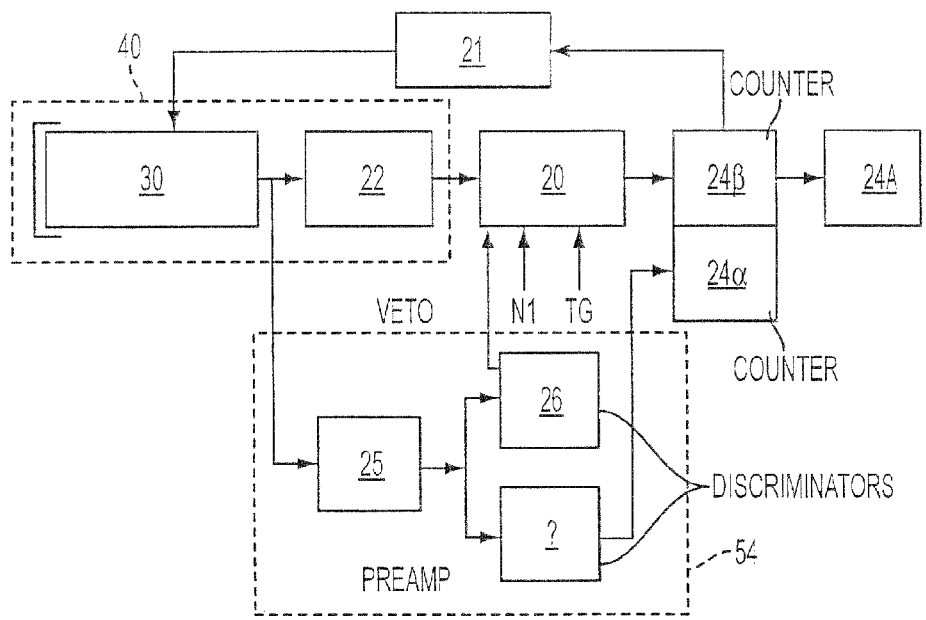
FIG. 5 is a second block diagram of an arrangement for discriminating between types of radiation by means of burst recognition and alpha channel.

Shown in FIG. 5 is a second block diagram of an apparatus, the essential design of which lies in that the burst recognition in the evaluation circuit 20 serves exclusively for the detection of beta particles, whereas, in parallel, an "alpha channel" 50 is operated in the conventional circuit mode exclusively for alpha detection. For the latter, a charge-sensitive preamplifier 25 with downstream pulse formation of approximately 1-20 μs and two integral discriminators 26 and 27 are provided. Discriminator 26 produces an output when the signal from amplifier 25 exceeds a threshold D1 and discriminator 27 produces an output when the amplifier signal exceeds a threshold D2. Preamplifier 25 receives the output signal from photomultiplier 30 which, in this variant, has a dual function, namely as a signal supplier for the alpha channel and as a component of the single-photon counter for controlling the evaluation circuit 20, which, in this case, is designed with a fast pulse amplifier with a dual pulse resolution of 30 to 40 ns with a fast integral comparator.

With this arrangement it is thus also possible to measure beta particles and alpha particles separately by selecting the evaluation method (burst recognition or conventional alpha channel), or also simultaneously/in parallel (burst recognition and alpha channel) since the output pulses of the photomultiplier 30 are evaluated both for the burst recognition as well as in the alpha channel 50.

In this context it needs to be noted that, due to the very intense interaction of alpha pulses or pulses from cosmic radiation with the scintillator, large light flashes are generated and thus a considerable afterglow (phosphorescence) and single photon signals are generated accordingly, which, without an additional measure, would also be registered by the burst recognition as ionizing events.

In order to prevent this, a simultaneous burst recognition is deactivated for a certain duration, e.g., 1 to 10 ms, when alpha pulses or pulses from cosmic radiation are being registered.

This is achieved by preventing the opening of the gate for burst recognition during the duration of the alpha particle detection (under control of a "veto signal" from discriminator 26).

Advantageously, two discriminator thresholds D1 and D2 are provided for this mode of operation. Discriminator threshold D1 is used to block the burst recognition through the veto signal and D2 relates to the beginning of alpha event counting in alpha counter 24α, wherein D2 is selected greater than D1 so that a gate pulse for the onset of the burst recognition is prevented as soon as there is a recognizable start of an alpha particle detection (reaching or exceeding of the first discriminator threshold D1), but counting of the output pulses for the "alpha" classification starts only when the second discriminator threshold D2 is passed.

While FIGS. 1 through 5 relate to the inventive evaluation of the output pulses of the photomultiplier 30, FIGS. 6 through 11 below concern the generation of the light flashes in the scintillator caused by ionizing events and the coupling into the inlet window of the photomultiplier.

In all cases, a transparent scintillator layer 12 with a decay time component of at least 100 ns is utilized according to the invention as the radiation sensitive detector. Layer 12 is preferably composed of ZnS(Ag), and applied as a thin layer onto an opaque and very thin metallized plastic film or a light-transparent carrier plate, preferably of plexiglass or glass. Due to this essential characteristic of the invention, an additional plastic scintillator is no longer required.

The layer thickness of the scintillator material 12 is selected such that the alpha particles of all radionuclides of interest are stopped (basis weight greater than 6 mg/cm$^2$) and the self-absorption of the light in the scintillator material can still be disregarded (basis weight below 100 mg/cm$^2$)

Photomultiplier 30 and components 20-27 can be constituted by known, commercially available products. By way of non-limiting example, photomultiplier 30 can be a product marketed by Electron Tubes, Ltd., Middx HA47TA, Great Britain, one suitable model being marketed under the designation 9114B. Components 20-27 can be found in devices marketed by Berthold Technologies GmbH & Co KG, such as an alpha/beta amplifier designated LB2028-1 and a photon counter designated LB9606.

Figure 6:
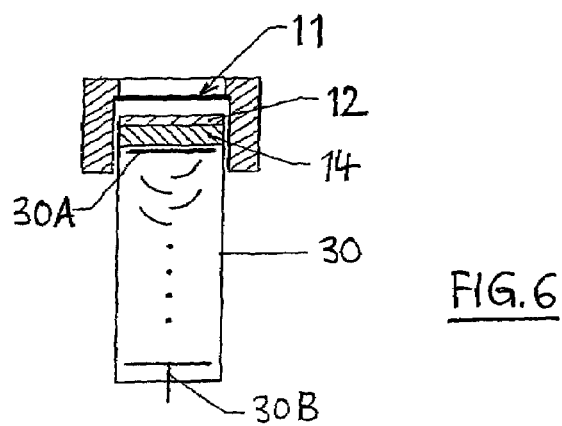
FIG. 6 is a pictorial representation of a first embodiment of the detector.

The simplest exemplary embodiment is shown in FIG. 6.

On a thin conductor of light 14, which is connected with the photocathode 30A of photomultiplier 30, a scintillator layer 12 is applied. The entire arrangement is mechanically sealed in a light-proof manner and has a very thin light-proof film 11 as the inlet window for the radiation. The electric output signal that occurs after an ionizing event is decoupled by the anode 30B and, as described above, routed to the single-photon amplifier 22 and, optionally, to the alpha channel 24α.

Figure 7:
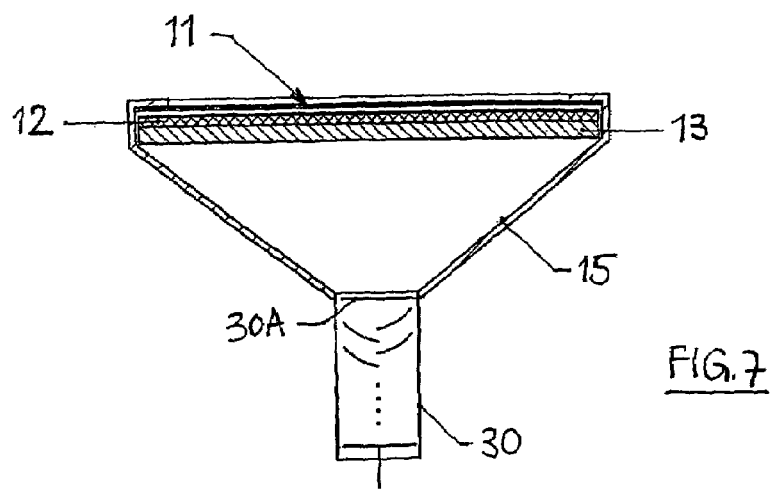
FIG. 7 is a pictorial representation of a second embodiment of the detector.

Alternatively, as shown in FIG. 7, collection of the light pulses from scintillator layer 12 may also be performed via a reflector 15, which bundles the light onto the flat or spherical photocathode 30A of the photomultiplier 30. A transparent carrier plate 13 and scintillator layer 12, in this case, are also located below a light-proof film 11.

Figure 8:
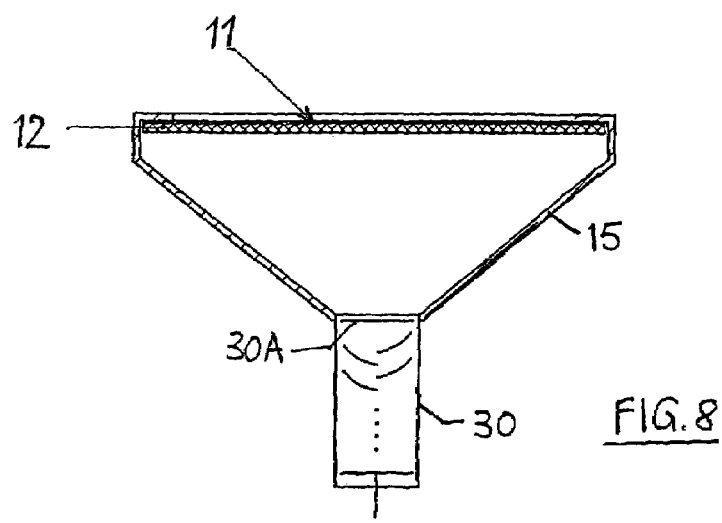
FIG. 8 is a pictorial representation of a third embodiment of the detector.

In the exemplary embodiment according to FIG. 8, the scintillator layer 12 is applied directly onto the side of the light-proof film 11 facing photomultiplier 30; a light-permeable carrier plate is not required in this case.

Figure 9:
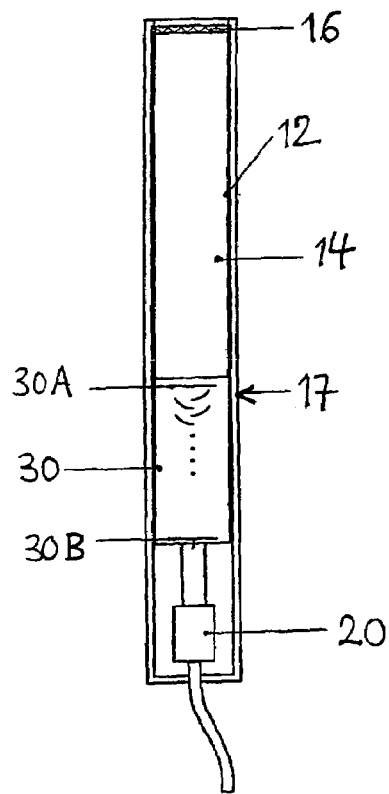
FIG. 9 is a pictorial representation of a fourth embodiment of the detector.

FIG. 9 shows the design of the scintillator as a rod detector, wherein the scintillator layer 12 is applied onto the exterior wall of a cylindrically shaped light conductor 14, one face end is connected to photomultiplier 30 and the other face end is connected to a mirror 16. The entire arrangement is installed in a light-tight manner, together with one of the apparatuses described in connection with FIGS. 1-5, into a tube 17 with a thin wall.

Figure 10:
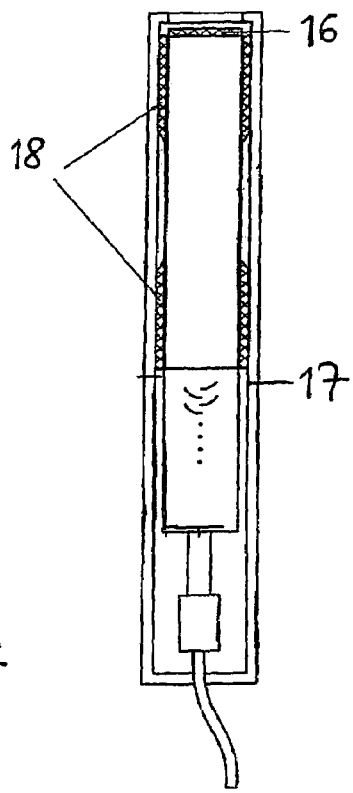
FIG. 10 is a pictorial representation of a fifth embodiment of the detector.

A similar arrangement is shown in FIG. 10, wherein the detector is designed as a dosimeter for gamma radiation. In order to be able to measure the dose rate in an energy-independent manner, an additional energy filter 18 is affixed around the detector. Filter 18 is fabricated according to principles known in the art to reduce the counting rate of gamma radiation having an energy level of 50 to 150 keV, in which range the counting rate of a gamma detector typically does not correspond to the actual radiation. Filter 18 can, for example, be a metal foil that is wrapped around the detector to attenuate radiation within the above-state energy range. In this case the light-tight tube 17 is made very thin so that the dose rate of low gamma energies can still be measured.

Figure 11:
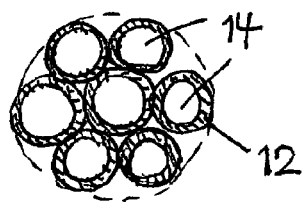
FIG. 11 is a pictorial representation of a sixth embodiment of the detector.

In lieu of a rod, thin optical light conductors may also be coated with a scintillator layer 12 and optionally bundled, whereby a particularly high sensitivity is attained. FIG. 11 shows an embodiment of that type in cross section.

Figure 12:
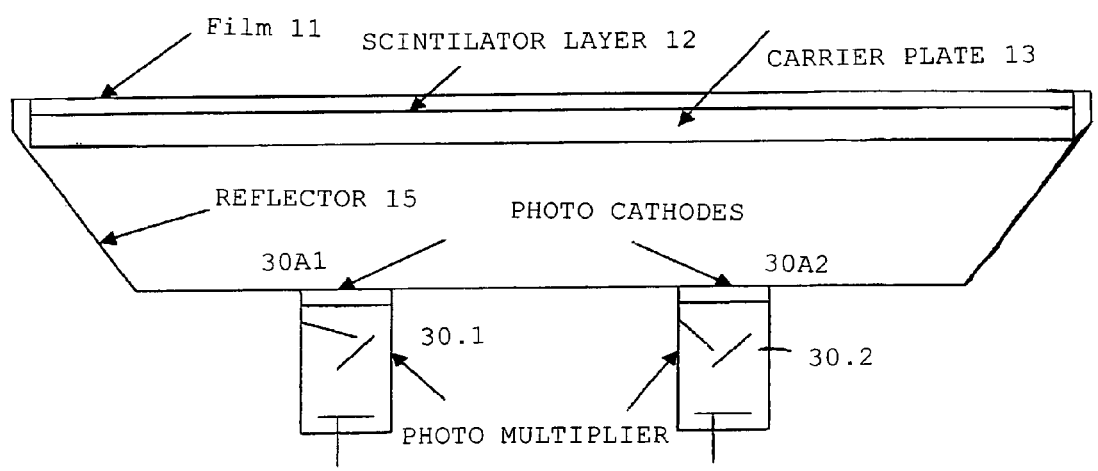
FIG. 12 is a pictorial representation of a seventh embodiment of the detector in which multiple single-photon counters are coupled to one scintillator.

If the surface area of the scintillator is significantly larger than the cathode surface area of the photomultiplier used in the single-photon counter, it may be advantageous to provide multiple single-photon counters 30.1, 30.2, etc., as shown in FIG. 12. This allows one to achieve a greater sensitivity and, with a suitable positioning of the single-photon counters, an improved homogeneity of the location sensitivity. For the further processing of the output pulses of the single-photon counter there are various options. For example, each of the single-photon counters may be provided with its own evaluation circuit. It is also advantageous, however, to operate with only one evaluation circuit, and to switch the output pulses from the single-photon counters in parallel to the input stage of the evaluation circuit.

In the latter case the above-described gate is opened by a pulse coming from one of the single-photon counters and the pulses of all single-photon counters that arrive during the opening time are counted.

This application relates to subject matter disclosed in German Application Number 10 2004 009 104.8, filed on Feb. 25, 2004, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

LIST OF REFERENCE NUMERALS

10 Scintillator
12 Scintillator Layer
13 Carrier Plate
14 Light Conductor
11 Film
15 Reflector
16 Mirror
17 Tube
18 Energy Filter
20 Evaluation Circuit
21 Supply Unit
22 Amplifier with Discriminator
24 Microprocessor Unit
25 Pre-Amplifier
26, 27 Integral Discriminators
28 Pulse Amplifier
30, 30.1, 30.2 Photomultiplier
30A Photocathode
30B Anode
40 Single-photon Counter
50 Alpha Channel

What is claimed is:

1. A method for simultaneously detecting ionizing radiation of different types, comprising:
    exposing a single solid matter scintillator that incorporates at least one decay time component greater than 100 ns to the radiation; and
    measuring photons emitted by the scintillator with a single-photon counter that includes a photomultiplier connected to receive photons from the scintillator and a single-photon amplifier connected to convert output pulses from the photomultiplier into single-photon pulses, wherein said step of measuring comprises:
        in a first channel, performing a burst recognition by opening a gate circuit for a certain time period TG in response to a first single-photon pulse from the single photon amplifier, and generating an output signal as a measure for an ionizing event as soon as a certain number N of additional pulses from the single photon amplifier is registered by the single-photon counter during the time period TG; and
        in a second channel in parallel with the first channel, performing an independent measurement of alpha radiation to which the scintillator is exposed by:
        pulse shaping of the output pulses from the photomultiplier; and
        when an alpha particle is detected in the second channel, preventing the start of a burst recognition for a pre-definable veto time.

2. The method according to claim 1, wherein the duration of TG is between 1 and 20 µs.

3. The method according to claim 1, further comprising, in order to discriminate or select a certain type of ionizing radiation with a single measurement, setting values of N and TG that are characteristic for a selected type of the radiation.

4. The method according to claim 1, wherein the veto time is between 1 and 10 ms.

5. The method according to claim 1, further comprising, for classification of the output pulses of the photomultiplier as alpha particles, setting a first amplitude threshold (Dl) in the second channel.

6. The method according to claim 5, further comprising setting a second amplitude threshold (D2) greater than the first amplitude threshold (Dl) at the beginning of counting in the second channel so that blocking of the burst recognition takes place prior to activation of the second channel.

7. The method according to claim 1, wherein the scintillator comprises ZnS(Ag).

\* \* \* \* \*